April 26, 1966

B. B. WEEKES 3,248,569

AMPLIFIER PASSIVE NONLINEAR FEEDBACK VOLTAGE LIMITING NETWORK

Filed June 26, 1963

INVENTOR.

BARRET B. WEEKES

BY

Samuel B. Stone

ATTORNEY

United States Patent Office 3,248,569
Patented Apr. 26, 1966

3,248,569
AMPLIFIER PASSIVE NONLINEAR FEEDBACK VOLTAGE LIMITING NETWORK

Barret B. Weekes, Newport Beach, Calif., assignor to Beckman Instruments, Inc., a corporation of California
Filed June 26, 1963, Ser. No. 290,778
11 Claims. (Cl. 307—88.5)

This invention relates to voltage limiters and more particularly to limiters particularly adapted for use with an amplifier to amplitude limit its output.

Frequently it is necessary to limit voltages associated with electronic components, such as amplifiers. In high accuracy data systems passive nonlinear feedback networks sometimes are used around the amplifiers therein to amplitude limit their output and to prevent saturation of the amplifier when a predetermined limit is exceeded. The prevention of saturation ensures the amplifier's rapid recovery to linear operation when the input overload condition (which tries to drive the amplifier beyond a prescribed limit) is removed. Generally, such nonlinear feedback networks have certain undesired effects upon the operation of the amplifier or associated circuitry. One particular instance is the effect that a nonlinear feedback network may have on a linear feedback network that is simultaneously used in parallel. One prior method of amplitude limiting, is the use of a pair of zener diodes back to back in parallel with a linear feedback network around an amplifier. This scheme only works where the linear feedback network has a low impedance and high band widths are not involved.

Accordingly, the present invention provides a passive nonlinear voltage limiter which may be used with an amplifier having linear feedback, and which has a minimal effect on the linear feedback network.

An additional feature of the present invention is the provision of an amplitude or voltage limiter employing diodes and which has a minimal effect on associated circuitry.

A further feature of the present invention is the provision of a limiter as previously described which limits in both positive and negative directions.

In a specific exemplary embodiment of a limiter constructed in accordance with the teachings of the present invention, a plurality of diodes are uniquely arranged in parallel with a linear feedback network around an amplifier. A first pair of diodes is employed to perform the actual voltage limiting function, and these diodes do not affect the amplifier's performance unless one is conducting in the breakdown condition. The remaining combinations of diodes are forward and reversed biased, with the forward biased diodes providing a shunt path to ground for the leakage and junction capacitance of the first diodes. Hence, the input of the amplifier effectively is isolated from the nonlinear feedback provided by the first diodes until the output of the amplifier exceeds a predetermined voltage limit.

Figure 1:
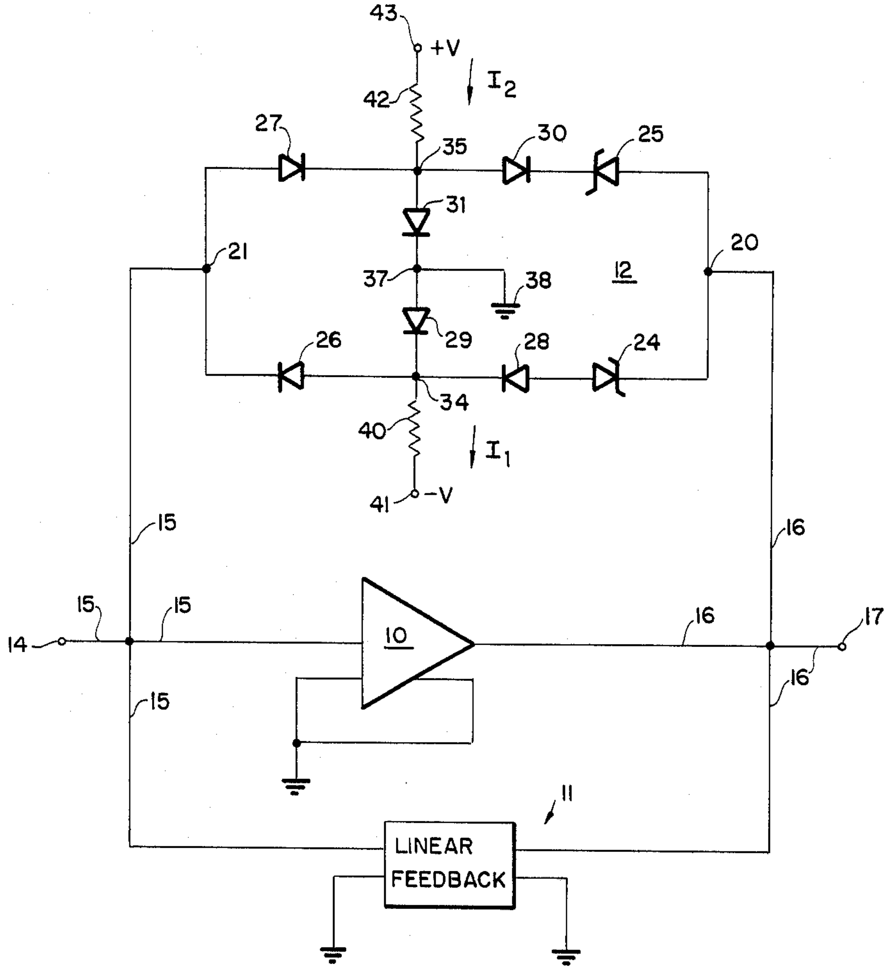
Figure 2:
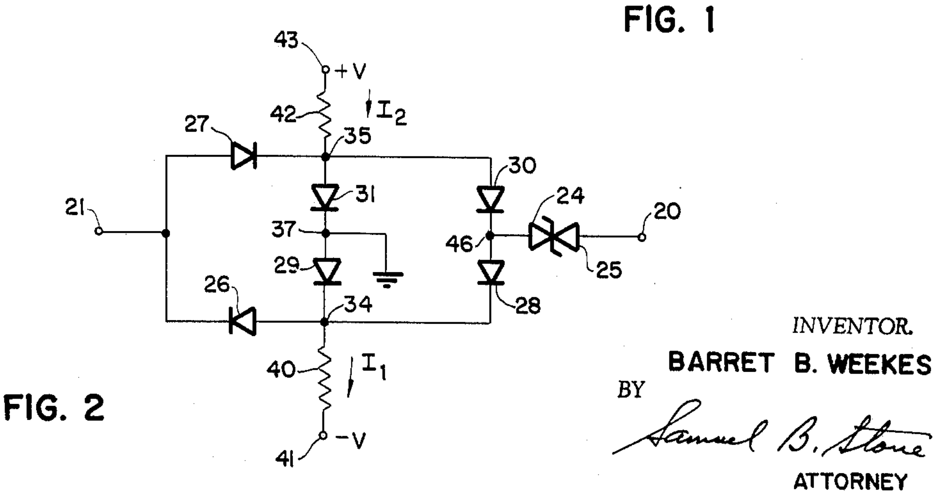

Other features and objects of the invention will be better understood from a consideration of the following detailed description when read in conjunction with the attached drawing in which:

FIG. 1 illustrates a voltage limiter constructed in accordance with the teachings of the present invention connected with an amplifier having a linear feedback network associated therewith; and FIG. 2 illustrates an alternative voltage limiter.

Referring now to FIG. 1, an amplifier 10, a linear feedback network 11, and a passive nonlinear feedback network which functions as a voltage limiter are illustrated. The arrangement shown in FIG. 1 may be used with an amplifier such as that disclosed in co-pending U.S.

application, Serial No. 290,779 entitled, "Pulse Amplifier," filed concurrently herewith by Hinrichs et al. and assigned to the assignee of the present invention. An input terminal 14 is connected through a line 15 to the input of the amplifier 10. The output of the amplifier is connected through a line 16 to an output terminal 17. The line 16 is connected through the linear feedback network 11 and the line 15 to the input of the amplifier 10. The line 16 also is connected to a terminal 20 of the voltage limiter. In a similar manner the line 15 is connected to a terminal 21 of the voltage limiter.

The voltage limiter includes diodes 24 through 31. The diodes 24 and 25 may be zener diodes which exhibit a sharp breakdown characteristic. The diodes 26 and 27 preferably are fast recovery (low capacitance) and low leakage silicon diodes. The remaining diodes 28 through 31 may be either silicon or germanium diodes of moderately low leakage.

The terminal 20 of the voltage limiter 12 is connected to the zener diodes 24 and 25. The diode 28 is connected between the zener diode 24 and a junction terminal 34, and the diode 30 is connected between the zener diode 25 and a junction terminal 35. The diode 26 is connected between the terminal 34 and the terminal 21, and the diode 27 is connected between the terminal 35 and the terminal 21. The diode 29 is connected between the terminal 34 and a voltage terminal 37 which is connected to ground at 38. The diode 31 is connected between the terminal 35 and the terminal 37. A resistance 40 is connected between the terminal 34 and a negative voltage terminal 41, and a resistance 42 is connected between the terminal 35 and a positive voltage terminal 43. The voltage sources connected to the terminals 41 and 43 and the resistances 40 and 42 function as respective current sink and sources $I_1$ and $I_2$ for supplying current to the junctions 34 and 35.

A description of the operation of the voltage limiter will now be given for positive limiting. It will be understood that negative limiting works in an identical manner. It should be noted at this point, that the diodes 24, 26, 28 and 29 provide positive voltage limiting; whereas, the diodes 25, 27, 30 and 31 provide negative voltage limiting. Accordingly, if only positive voltage limiting is desired the diodes 25, 27, 30 and 31, and the resistance 42 and positive voltage source connected to the terminal 43 may be omitted. The converse is true if only negative limiting is desired.

Initially, the current sink $I_1$ provided by the resistance 40 and the negative voltage connected to the terminal 41 biases on the diode 29 and consequently reverse biases the diode 26 since terminal 21 is at virtual ground potential because of the operational configuration of amplifier 10. The biased on condition of the diode 29 provides a low D.C. resistance to ground for the leakage current of the diode 28 if the output of the amplifier is negative or for the leakage current of the diode 24 if the output of the amplifier is less than the positive limit determined by the diode network. The diode 29 also provides a low A.C. impedance which shunts to ground the output which is capacitively coupled through the diodes 24 and 28 before breakdown occurs. In particular, a zener diode is notorious for its large junction capacitances and must be guarded against shunting the linear feedback network 11.

When the positive limit is reached, the zener diode 24 breaks down and starts conducting. When the zener diode 24 breaks down, the diode 28 becomes forward biased. The current sink $I_1$ obtains all of its current from the conducting diodes 24 and 28, and then reverse biases the diode 29 but forward biases the diode 26. The output of the amplifier 10 now is conductively coupled through a low impedance to its input but shifted by an amplitude level determined by the sum of the zener voltage of the diode 24 plus the two forward voltages of the diodes 28 and 26. With a low impedance in the limiter feedback, the gain of the amplifier is greatly reduced and input signals much greater than full scale can be tolerated without saturating the amplifier. It will be appreciated that a similar operation obtains for negative limiting.

As noted previously, the use of diodes as voltage limiters as described herein does not affect the amplifier's performance except when the diodes are conducting in the breakdown condition. Particularly, the moderately high leakage and high junction capacitance of zener diodes is otherwise shunted to ground through the forward biased diodes 29 and 31. This forward bias imposes a reverse bias on the diodes 26 and 27. Hence, the input of the amplifier is isolated from the nonlinear feedback until the output exceeds the predetermined voltage limit.

An alternative voltage limiter is illustrated in FIG. 2, wherein like reference numerals are utilized to designate like components found in FIG. 1. The only difference in the manner of construction of the voltage limiter in FIG. 2 is the manner in which the diodes 24, 25, 28 and 30 are interconnected. The input terminal 20 is connected to the diodes 24 and 25 which are connected back to back in series between the terminal 20 and a junction terminal 46. The diode 28 is connected between the terminal 46 and the terminal 34, and the diode 30 is connected between the terminal 46 and the terminal 35. The remaining components are connected in the same manner as illustrated in FIG. 1.

The arrangement shown in FIG. 2 operates substantially identical to that shown in FIG. 1, with the current sink $I_1$ biasing on the diode 29 and reverse biasing the diode 26 for positive limiting. When the positive limit is reached, the diode 24 breaks down, conducts and forward biases the diode 28. Current sink $I_1$ takes all of its current from the diodes 24 and 28, thereby reverse biasing the diode 29 and forward biasing the diode 26. Hence, the output of the amplifier with which the voltage limiter shown in FIG. 2 may be connected is now conductively coupled through a low impedance to its input. A similar operation occurs for negative limiting. Alternatively, if limiting at a lower voltage level is desirable the zener diodes 24 and 25 may be omitted.

It now should be apparent that the present invention provides a voltage limiter employing a plurality of uniquely interconnected diodes. A first pair of diodes is employed, and these diodes do not affect the operating characteristics of associated circuitry until a predetermined limit is reached. Any leakage and junction capacitance of the first diodes is otherwise shunted to ground through forward biased diodes.

Although an exemplary embodiment of the present invention has been disclosed and discussed, it will be understood that other applications and circuit arrangements are possible and that the embodiment disclosed may be subjected to various changes, modifications and substitutions without necessarily departing from the spirit of the invention.

What is claimed is:

1. A voltage limiter for use with an amplifier having a linear feedback network coupled therewith comprising
an input terminal and an output terminal,
first and second voltage terminals for connection across a source of potential,
first, second, third, and fourth diodes,
said first, second, and third diodes being connected in series between said input and output terminals, with said first diode poled in a direction opposite to said second and third diodes,
a junction terminal between said second and third diodes, said fourth diode being connected between said first voltage terminal and said junction, and
an impedance, said impedance being connected between said junction and said second voltage terminal.

2. A voltage limiter as in claim 1 wherein said first diode is a zener diode.

3. A voltage limiter as in claim 1 including,
fifth, sixth, seventh and eighth diodes,
a third voltage terminal for connection to said source and a second junction terminal,
said fifth, sixth and seventh diodes being connected in series between said input and output terminals,
said fifth diode being poled opposite to said sixth and seventh diodes, said second junction terminal being between said sixth and seventh diodes,
said eigthth diode being connected between said first voltage terminal and said second junction, and
a second impedance, said second impedance being connected between said second junction and said third voltage terminal.

4. A voltage limiter as in claim 3 wherein,
said first and fifth diodes are oppositely poled, and said fourth and eighth diodes are similarly poled.

5. A voltage limiter as in claim 3 wherein said first and fifth diodes are zener diodes.

6. A voltage limiter as in claim 1 including
a third voltage terminal for connection to said source, and second and third junction terminals,
fifth, sixth, seventh and eighth diodes,
said fifth, sixth and seventh diodes being connected in series between said input and output terminals, said fifth diode being oppositely poled with respect to said sixth and seventh diodes, and being poled oppositely with respect to said first diode,
said eighth diode being connected between said first voltage terminal and said second junction,
a second impedance, said second impedance being connected between said second junction and said third voltage terminal, and
said third junction being between said second and sixth diodes.

7. A voltage limiter as in claim 6 wherein said first and fifth diodes are zener diodes.

8. A voltage limiter for use with an amplifier having a linear feedback network connected therewith comprising
an input terminal and an output terminal,
first, second and third voltage terminals for connection across a source of potential,
first and second junction terminals,
a plurality of diodes,
first, second and third of said plurality of diodes being connected in series between said input and output terminals, with said first diode being poled oppositely with respect to said second and third diodes,
said first junction being between said second and third diodes.
a fourth of said diodes being connected between said first voltage terminal and said first junction,
fifth, sixth and seventh of said plurality of diodes being connected in series between said input and output terminals, with said fifth diode being poled oppositely with respect to said sixth and seventh diodes,
said second junction being between said sixth and seventh diodes,
the eighth of said plurality of diodes being connected between said first voltage terminal and said second junction,
said first and fifth diodes being oppositely poled,
first and second impedances, and
said first impedance being connected between said first junction and said second voltage terminal, and said second impedance being connected between said second junction and said third voltage terminal, said second and third voltage terminals and said first and second impedances functioning as current sources or sinks depending upon whether said source applied thereto is positive or negative, respectively, with regard to the level at said first voltage terminal.

9. A voltage limited amplifier including an operational amplifier having a linear feedback network coupled therewith,
an input terminal and an output terminal,
said operational amplifier and said linear feedback network being connected in parallel and to said input and output terminals, first and second voltage terminals for connection across a source of potential,
first, second and third diodes,
said first and second diodes being connected in series between said input and output terminals, with said first and second diodes being poled in the same direction,
a junction terminal connected between said first and second diodes,
said third diode being connected between said first voltage terminal and said junction, and
an impedance, said impedance being connected between said junction and said second voltage terminal with said impedance and said second voltage terminal when a source of voltage is applied thereto serving as a current source or sink depending upon whether said source applied thereto is positive or negative respectively with regard to the level at said first voltage terminal.

10. A voltage limiter as in claim 9 including,
fourth, fifth and sixth diodes,
a third voltage terminal for connection to said source,
a second junction terminal,
said fourth and fifth diodes being connected in series between said input and output terminals, with said fourth and fifth diodes being poled in the same direction, and poled opposite to said first and second diodes,
said sixth diode being connected between said first voltage terminal and said second junction, a second impedance, said second impedance being connected between said second junction and said third voltage terminal with said second impedance and said third voltage terminal when a source of voltage is applied thereto acting as a current source or sink depending upon whether said source applied thereto is positive or negative with regard to the level at said first voltage terminal.

11. A voltage limited amplifier including an operational amplifier, a linear feedback network, input and output terminals, said operational amplifier and said linear feedback network being connected in parallel and to said input and output terminals, the improvement comprising
first and second voltage terminals for connection across a source of potential,
first, second, third, and fourth diodes,
said first, second, and third diodes being connected in series between said input and output terminals, with said first diode being poled in a direction opposite to said second and third diodes,
a junction terminal between said second and third diodes,
said fourth diode being connected between said first voltage terminal and said junction, and
an impedance, said impedance being connected between said junction and said second voltage terminal.

References Cited by the Examiner

UNITED STATES PATENTS 3,166,720 1/1965 Rosen et al. ---------- 330—103

FOREIGN PATENTS 567,866 6/1958 Belgium.

ARTHUR GAUSS, *Primary Examiner.*

JOHN W. HUCKERT, *Examiner.*

M. LEE, *Assistant Examiner.*